UNITED STATES PATENT OFFICE.

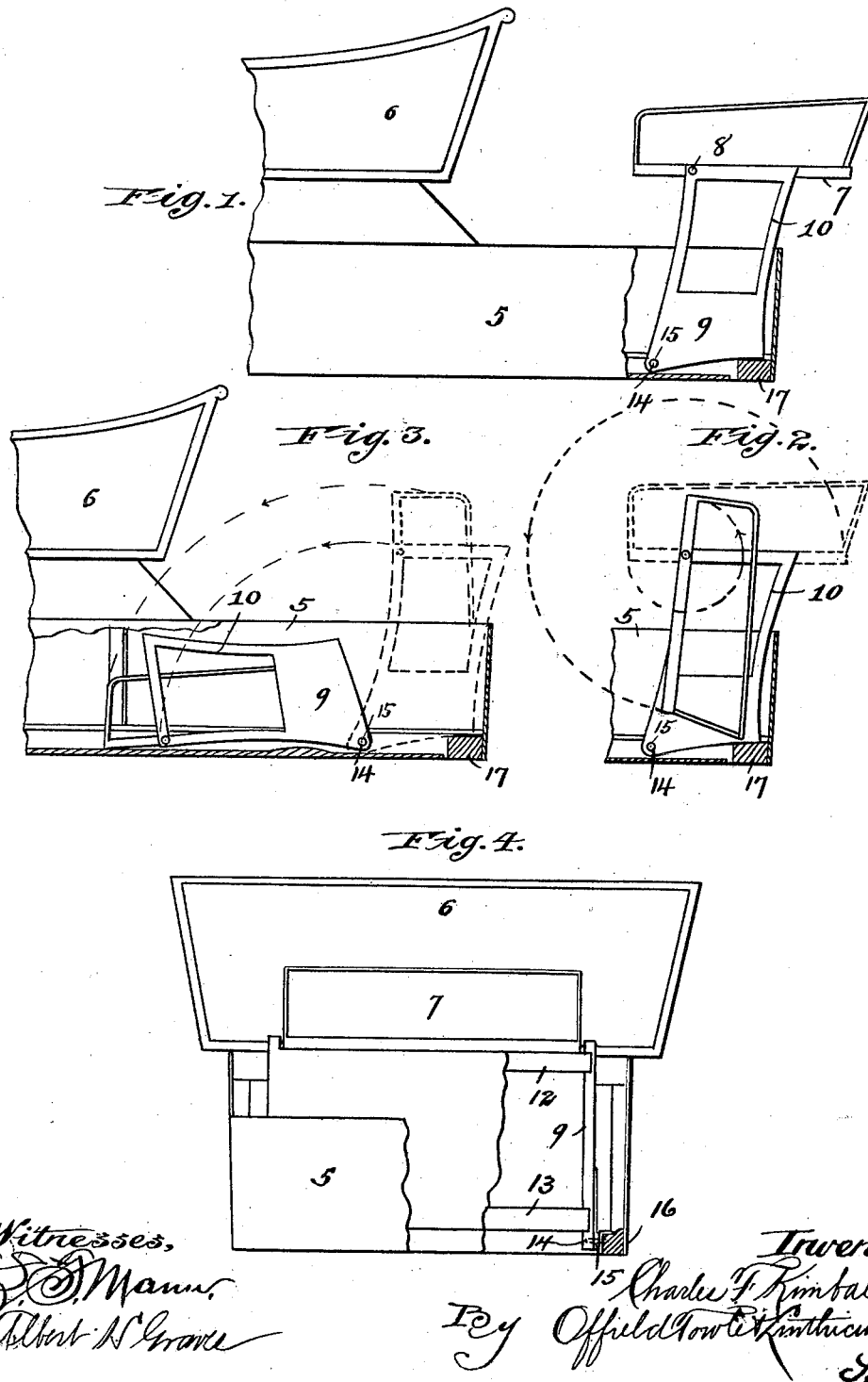

CHARLES F. KIMBALL, OF CHICAGO, ILLINOIS.

FOLDING VEHICLE-SEAT.

SPECIFICATION forming part of Letters Patent No. 693,654, dated February 18, 1902.

Application filed August 6, 1900. Serial No. 26,017. (No model.)

*To all whom it may concern:*

Be it known that I, CHARLES F. KIMBALL, of Chicago, Illinois, have invented certain new and useful Improvements in Folding Vehicle-Seats, of which the following is a specification.

It is desirable in many classes of single-seated vehicles, and particularly in light pleasure-carriages—such as runabouts, stanhopes, and the like—to have additional provision for accommodating one or more persons, and to this end it is common to employ movable or adjustable seats. It is undesirable, however, to have such adjustable or movable seats so applied that any portion thereof is visible when it is not in use.

It is the object of my invention to provide an adjustable or auxiliary seat for vehicles so constructed and mounted that it may quickly and easily be placed in position for use and as readily removed from view when not required for use and in the latter position be hidden by the sides of the vehicle-body.

My invention is illustrated in the accompanying drawings, in which—

Figure 1 is an elevation, partly in section, of a vehicle-body, showing the adjustable or auxiliary seat in position for use. Fig. 2 is a similar view of the rear end only of the vehicle-body, showing the auxiliary seat partially folded. Fig. 3 is a view similar to Fig. 1, with the auxiliary seat completely folded, the dotted lines showing the manner of folding. Fig. 4 is a rear elevation, partly in section, showing the hinged standards or supports for the auxiliary seat.

My invention may be applied to almost any type of vehicle-body, but is shown as applied to the ordinary open buggy-box 5, having the seat 6 mounted thereon and which may be of usual design. Said seat is marked 7 and is pivoted near its lower front corner, as shown at 8, to a pivoted seat-support. As shown, the latter consists of the standards 9, which may be light castings or of wood, preferably open above the box-body, as shown at 10, and may be connected transversely at their rear sides near their ends by the cross-pieces 12 13. Said standards are pivoted at their lower front corners, as indicated at 14, the pivots shown being ordinary pins 15, passing into the body-sills 16. The cross-rail 17 of the body affords a rest or abutment to support the standards in the upright position. The seat in the extended position is supported at its rear end by the cross-piece 12.

The seat when in the position shown in Fig. 1 is adapted for use and may be of a width to accommodate one person only—as, for example, a footman where the vehicle is of the more elaborate or expensive kind—or such seat may be of any width less than the width of the body or box in which it is mounted. When it is desired to dispense with the use of the seat, it may be turned upon the pivot 8 forwardly in the direction indicated by the dotted lines of Fig. 2 and through approximately three-fourths of a circle, whereupon the seat will be disposed with its greatest length vertically and its open side presented rearwardly. It may then be swung forward with its standards upon the pivots 14, as indicated in the dotted lines of Fig. 3, and rest upon the bottom of the box or body. In this position its forward end will pass under the seat 6 through the opening below the bottom of said seat and the auxiliary seat and its standards will be concealed or hid from view from the side by the sides of the vehicle box or body.

Obviously the particular design or shape of the seat and of the support and the precise method of mounting the seat upon the support and the latter upon the box or vehicle-body may be varied; but

What I claim as new, and desire to secure by Letters Patent, is—

1. The combination with a vehicle box or body, of a folding seat therefor comprising standard members having relatively wide upper and lower supporting end portions, pivotally mounted within the vehicle-body in parallel relation to move together upon a pivot-axis extending through lower corner portions of said standards, a seat-body pivotally mounted between said seat-standards upon an axis extending through the forward portion of the seat and corresponding corner portions of the seat-standards, and a support upon said standards adapted to hold the seat in horizontal position when extended, said seat being adapted to fold into a position between the plate-like standards and the latter being adapted to fold downwardly into position within the vehicle-box.

2. The combination with a vehicle box or body, of a folding seat therefor comprising a pair of plate-like standards pivotally mounted in parallel relation within and at opposite sides of the vehicle-box upon a pivotal axis extending through the lower front corner portions of said standards, the rear lower portions of said standards being adapted to rest in upright position upon an underlying fixed support whereby the standards are held firmly in upright position but may be tilted forwardly, a seat-body pivotally mounted between the upper ends of said standards upon an axis extending through the front upper corner portions of the standards and corresponding portion of the seat, said axis being located well in front of the central transverse line of the seat, whereby the latter tends to tilt backwardly and downwardly when loaded, and a transverse support extending between the rear portions of said standards in position to support the seat horizontally when the standards are in upright position, said seat being adapted to fold forwardly upon its pivotal axis into a position between and substantially in register with the seat-standards and the latter being adapted to tilt forwardly to lie longitudinally within the vehicle-box, substantially as described.

3. The combination with a vehicle-box provided along its lower longitudinal sides with sill members, as 16, and a transverse sill member as 17, of a pair of standards, as 10, mounted upon said longitudinal sill members upon pivot-axes extending transversely to the box or body, as 14, and adapted to rest at their lower ends upon said transverse sill member, and a seat, as 7, pivotally mounted between the upper ends of said standards upon an axis located adjacent to the side margins of said standards, and a support extending between said standards adapted to hold the seat in operative position when the standards are erect, said seat being adapted to fold into position between, and substantially in register with, said standards and the latter being adapted to fold downwardly, with said seat therebetween, within the box, substantially as described.

CHARLES F. KIMBALL.

Witnesses:
D. G. McDiarmid,
F. A. Bondel-Smith.